United States Patent

[11] 3,581,845

| [72] | Inventor | Gerrit Van Nederynen<br>Sayre, Pa. |
|---|---|---|
| [21] | Appl. No | 805,134 |
| [22] | Filed | Mar. 7, 1969 |
| [45] | Patented | June 1, 1971 |
| [73] | Assignee | Ingersoll-Rand Company<br>New York, N.Y. |

[54] AIR LINE OILER
6 Claims, 7 Drawing Figs.

| [52] | U.S. Cl. | 184/7D,<br>184/56 |
|---|---|---|
| [51] | Int. Cl. | F16n 25/02 |
| [50] | Field of Search | 184/7 C1, 7<br>C2, 55 A, 56, 55 |

[56] References Cited
UNITED STATES PATENTS

| 2,667,236 | 1/1954 | Graves | 184/56X |
|---|---|---|---|
| 2,719,603 | 10/1955 | Leclair | 184/7 |
| 3,031,032 | 4/1962 | Dinkell Kamp et al. | 184/7 |
| 3,121,475 | 2/1964 | McKenzie | 184/7 |
| 3,129,788 | 4/1964 | Heckt | 184/55 |

*Primary Examiner*—Manuel A. Antonakas
*Attorneys*—Carl R. Horten and David W. Tibbott ABSTRACT: An air line oiler for injecting a slug of oil into an air line at the end of each pressure cycle and including a body containing air and oil ports, a combined piston and plunger and an oil chamber housing the plunger. At the start of the application of air pressure, the plunger draws oil into the chamber and thereafter pumps the oil into the air line when the air pressure is released.

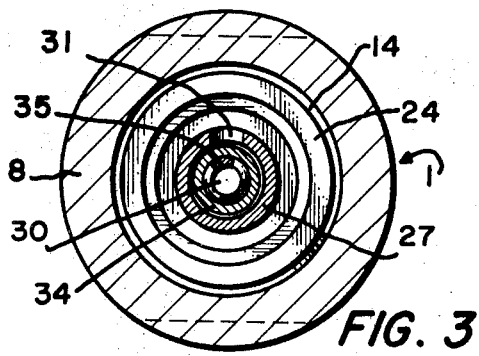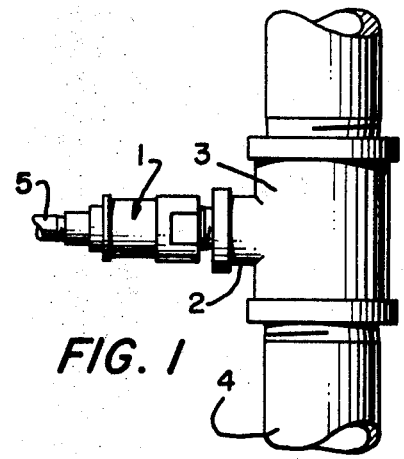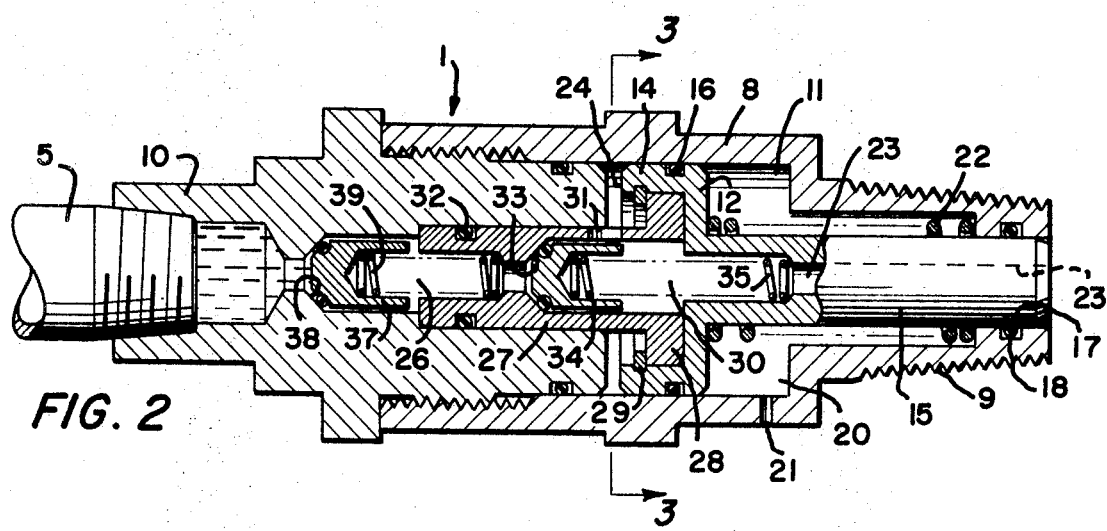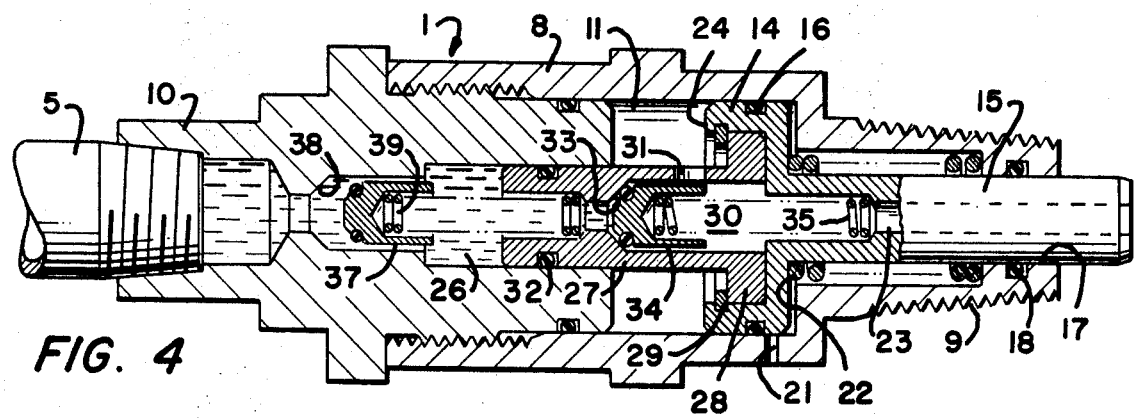

INVENTOR
GERRIT VAN NEDERYNEN
BY
*David W. Tilton*
ATTORNEY

AIR LINE OILER

BACKGROUND OF INVENTION

This invention relates generally to injectors for injecting a quantity of liquid into a fluid conduit and more particularly to a lubricant injector for a compressed air line. The type of lubricant injector is generally known as an air line oiler.

A conventional type of air line oiler delivers oil to the air line at the start of the application of pressure to the air line. Injecting oil at the start of a pressure cycle means the oil must be forced in against the line pressure which tends to break up and partially atomize the oil. This is believed to render the oil less effective to lubricate. Also, a part of the oil injected during a pressure cycle may be evaporated by the heat of the machinery driven by the air line, such as an air starter, thereby being lost for lubrication purposes. In addition, separate small particles of oil are believed to be less effective than a slug of oil for washing sludge out of compressed air driven machinery.

SUMMARY OF INVENTION

The principal object of this invention is to provide a novel liquid injector for use with a gasline which delivers a measured quantity of liquid to the gasline when the gas pressure is released.

Other important objects of this invention are: to provide an air line oiler which delivers lubricant to the air line at the end of a pressure application cycle; to provide an air line oiler which injects a slug of lubricant into an air line; to provide an air line oiler which injects oil into an air line without substantially breaking up or atomizing the oil into separate particles; to provide an air line oiler which needs only a single connection to the air line; and to provide an air line oiler having a relatively simple and economical construction and being of comparatively small size.

In general, the objects of this invention are attained in a body containing a gas port, a liquid port and movable means movable in one direction in response to the application of pressure to the gas port. A liquid chamber in the body is connected to the liquid port and means is provided to move the movable means in a second direction in response to the release of gas pressure to force the liquid in the chamber through the gas port.

BRIEF DESCRIPTION OF DRAWINGS

The invention is described in connection with the accompanying drawings wherein:

FIG. 1 is a fragmentary elevational view of an air line oiler connected to an air line;

FIG. 2 is an enlarged axial section of the air line oiler shown in FIG. 1;

FIG. 3 is a cross section taken on the line 3—3 in FIG. 2;

FIG. 4 is an axial section similar to FIG. 2 and showing the plunger of the air line oiler in its opposite position from the position shown in FIG. 2;

DESCRIPTION OF PREFERRED EMBODIMENTS

Figure 5:
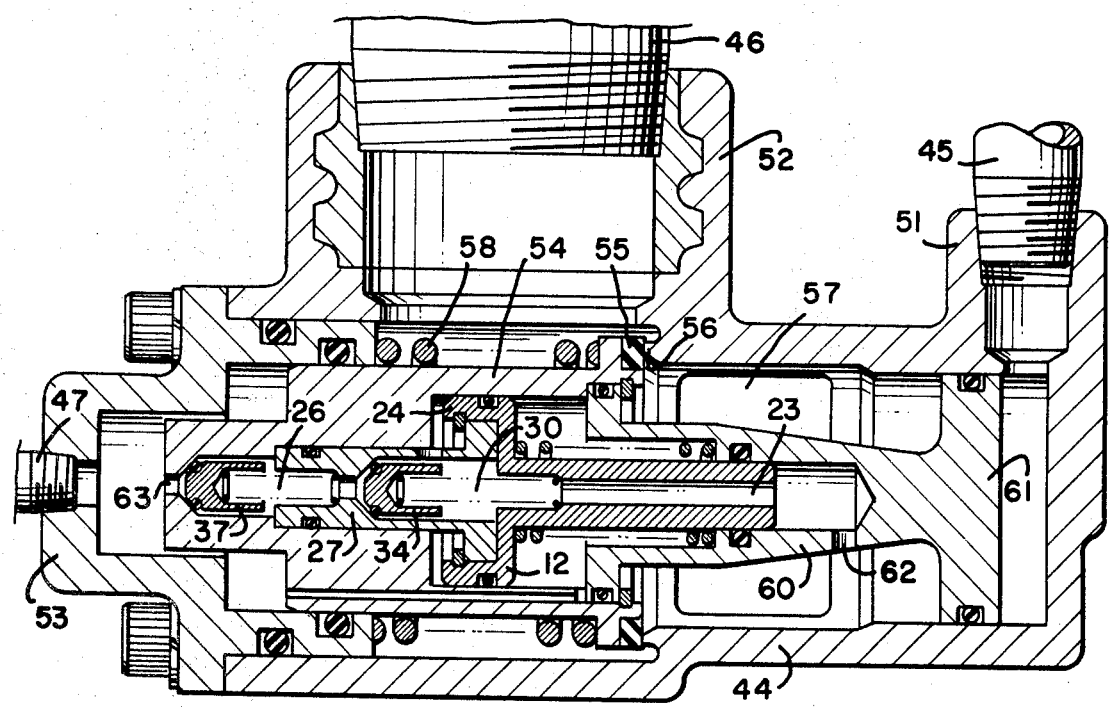
FIG. 5 is an axial section of a second embodiment having the oiler contained in a pilot-operated inlet valve of an air starter.
Figure 7:
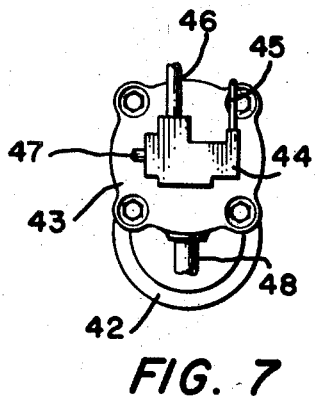
FIG. 7 is a elevational view showing showing the rear end of the air starter of FIG. 6.

FIG. 1 shows an air line oiler or lubricator 1 threaded into the stem 2 of a T-fitting 3 interposed in an air line 4. The other end of the air line oiler 1 is threaded to an oil line 5 for delivering oil or lubricant to the oiler 1. The air line 4 may be used to feed compressed air to various devices that might require a small quantity of lubricant mixed with the air, for example, an air starter used to start internal combustion engines such as truck engines.

The air line 4 is located after a valve (not shown) which is opened and closed to admit and bar the admission of compressed air to the air line 4. Generally, the oiler 1 is used where compressed air is periodically admitted to the air line 4, rather than being continuously admitted.

The construction of the air line oiler 1 is shown in FIGS. 2 to 4. The oiler 1 includes a casing or body 8 having a threaded air line port 9 at its forward end and a threaded lubricant inlet port 10 at its rear end. For convenience of assembly, the body 8 is shown as formed of two parts which are threaded together.

The forward portion of the body 8 contains a cylindrical cavity 11 and a reciprocable piston 12 sliding longitudinally in the cavity 11. The piston 12 includes an enlarged head 14 and a forwardly projecting stem 15 with the head carrying an O-ring 16 sliding on mating walls of the cavity 11. The piston stem 15 is slidably encircled by a bearing portion 17 located in the outer end of the air line port 9 and carrying another O-ring seal 18 engaging the piston stem 15. The front portion of the cavity 11 located between the piston head 14 and the air line port 9 is designated a vented space 20 and is vented through a port 21 located in the body 8.

The vented space 20 contains a spring 22 which encircles the piston stem 15 and urges the piston 12 rearwardly to the position shown in FIG. 2. The piston 12 contains an axial passage 23 running from the front end of the piston stem 15 to the rear face 24 of the piston head 14 for feeding compressed air from the air line to the rear face 24 of the piston 12. The application of compressed air to the rear face 24 of the piston 12 forces the piston 12 forwardly to the position shown in FIG. 4. This will occur each time the air line 4 is loaded with compressed air, such as when an air starter is driven by compressed air.

A lubricant chamber 26 is located in the rear portion of the body 8 and contains a reciprocating plunger 27 fixed to the piston 12. As shown in the drawings, the head 14 of the piston 12 is cup-shaped and the plunger 27 includes an enlarged end 28 attached in the head 14 by a retainer ring 29. The plunger 27 contains an axial passage 30 opening into the axial passage 23 located in the piston 12. The forward portion of the axial passage 30 contains a side port 31 communicating or interconnecting the piston passage 23 to the rear face 24 of the piston head 14. The plunger 27 includes an O-ring seal 32, for engaging the wall of the chamber 26 for sealing purposes.

Rearwardly of the side port 31 in the passage 30 is a reduced area portion forming a beveled shoulder and serving as a check valve seat 33. A plug-type check valve 34 is located in front of the valve seat 33 to allow forward flow of lubricant from the chamber 26 into the piston passage 23 while preventing a reverse flow of air into the chamber 26. The check valve 34 is urged rearwardly against its seat 33 by a spring 35 contained in the axial passages 30 and 23.

A second check valve 37 is located in the chamber 26 rearwardly of the plunger 27 to allow lubricant to enter the chamber from the oil line 5 while preventing a reverse flow of either lubricant or compressed air. The second check valve 37 seats against a beveled shoulder or seat 38 and is urged rearwardly against the seat by a spring 39 interposed in the chamber 26 between the check valve 37 and the plunger 27.

OPERATION

FIG. 2 shows the position of the elements of the air line oiler 1 prior to the application of compressed air to the air line 4. The piston 12 and the plunger 27 are in their rearmost positions, being urged in that direction by the spring 22. Oil is available in the pipe 5. The check valves 34 and 37 prevent the oil from entering the chamber 26 and flowing through the plunger passage 30 and the piston passage 23.

The application of compressed air to the air line 4 causes the compressed air to flow through the piston passage 23, the forward portion of the plunger passage 30, the side port 31 and onto the rear face 24 of the piston 12. The pressure on its rear face 24 forces the piston 12 forward to its forward position as shown in FIG. 4.

The forward movement of the piston 12 also carries the plunger 27 forward which places a suction on the chamber 26 acting to draw oil past the check valve 37 into the chamber 26. At the same time, the check valve 34 acts to block compressed air from entering the chamber 26. Once the piston 12 and the plunger 27 reach their forward positions shown in FIG. 4, they will remain there until the compressed air in the air line 4 is released or drops in pressure sufficiently for the spring 22 to overcome the force on the face 24 of the piston head 14.

After the pressure is either released or sufficiently drops, the spring 22 will return the piston 12 and plunger 27 to their rear positions shown in FIG. 2 and the oil or lubricant in the chamber 26 is forced as a slug past the check valve 34 and through the axial passages 30 and 23 into the air line 4 where it will remain generally in the form of a slug until picked up by the air on the next cycle of application of compressed air to the air line 4. During the pumping of the oil in the chamber 26 past the check valve 34, the second check valve 37 will remain closed to prevent the oil from being pumped past it into the oil line 5.

Figure 6:
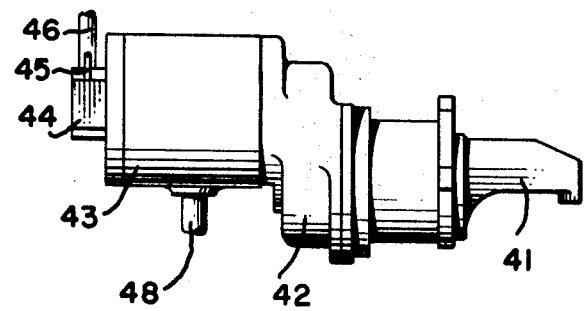
FIG. 6 is an elevational side view on a reduced scale of an air starter showing the inlet valve of FIG. 5 mounted on the rear end of the starter.

SECOND EMBODIMENT, FIGS. 5 and 6

The second embodiment is an example of the air line oiler of FIGS. 1 to 4 located in a pilot-operated inlet valve of an air starter 40. The air starter 40 is conventional and is shown in FIG. 6 as including a front nose 41 containing a drive pinion (not shown), an intermediate gear box 42 and an air motor 43. The rear end of the motor 43 carries an inlet valve housing 44 which is connected to three pipes or lines including a pilot air line 45, a main supply line 46, and an oil line 47. The side housing of the motor 43 is connected to an exhaust line 48.

FIG. 5 shows the elements inside of the inlet valve housing 44. In describing the following the same reference numbers are applied to structure similar to that shown in the first embodiment. The valve housing 44 is conventional and includes a pilot air port 51 connected to the pilot air line 45, a main supply port 52 connected to the main air line 46 and a lubricant supply port 53 connected to the oil line 47. A reciprocating spool valve 54 is slidably mounted in the housing 44 and includes a valve face 55 seating against a valve seat flange 56 to bar air in the main supply port 52 from entering the motor inlet port 57. A heavy spring 58 circles the spool valve 54 and urges valve 54 against its seat 56.

The spool valve 54 includes a forward extension 60 connected to a pilot piston 61 sliding into the forward part of the housing 44 adjacent the pilot air port 51. The admission of pilot air to the pilot air port 51 acts on the pilot piston to open the spool valve 54 thereby admitting air from the main supply port 52 to the motor inlet port 57.

The spool valve 54 and its extension 60 serve as the body for the air line oiler components which operate in the same manner as in the first embodiment. When the spool valve 54 is opened, compressed air flows through the air port 62, located in the extension 60, through the piston passage 23 and acts on the rear face 24 of the piston 12 to move the piston 12 and plunger 27 forward.

The forward movement of the plunger 27 draws oil into the chamber 26 through an oil port 63 located in the rear end of the spool valve 54 and past the check valve 37. Thereafter, when the spool valve 54 is closed to bar the compressed air from the motor inlet port 57, the piston 12 and plunger 27 return to their rear positions shown in FIG. 5. In returning, the plunger 27 pumps oil in the chamber 26 past the check valve 34 through the passages 30 and 23 and out of the air port 62 into the space in the housing 44 surrounding the motor inlet port 57. The oil will remain in this general space until being picked up by the air flowing past the valve 54 on its next opening cycle.

While several embodiments of the invention are shown and described in detail, this invention is not limited simply to the specifically described embodiments, but contemplates other embodiments and variations which utilize the concepts and teachings of this invention.

I claim:

1. An air line lubricator comprising:
   a body containing an air line port and a lubrication port, said air line port being adapted to be connected to an air line and said lubrication port being adapted to be connected to a supply of lubricant;
   a lubricant chamber in said body adapted to hold a measured amount of lubricant;
   a piston in said body movable in one direction in response to the application of pneumatic pressure to said air line port and operative, in moving in said one direction, to draw lubricant into said chamber; and
   means for moving said piston in a second direction in response to the release of said pneumatic pressure from said air line port to force the lubricant in said chamber through said air line port.

2. The lubricator of claim 1 comprising:
   a plunger reciprocating in said chamber and connected to said piston to move in unison with it for forcing said lubricant through said air line port.

3. The lubricator of claim 3 wherein:
   said piston has an actuating surface adapted to receive pneumatic pressure for moving it in said one direction; and
   said piston also includes a longitudinal passage communicating said actuating surface with said air line port.

4. The lubricator of claim 3 wherein:
   said longitudinal passage also communicates said lubricant chamber with said air line port.

5. The lubricator of claim 4 including:
   a check valve located between said lubricant chamber and said longitudinal passage and operative to allow lubricant to enter said passage while preventing air pressure from flowing from said passage into said chamber.

6. The lubricator of claim 5 including:
   a spring urging said piston in said second direction to force lubricant through said air line port when the pneumatic pressure is released.